United States Patent [19]

Bouiller et al.

[11] Patent Number: 4,907,743
[45] Date of Patent: Mar. 13, 1990

[54] ASSEMBLY OF TWO BODIES HAVING DISTINCTLY DIFFERENT COEFFICIENTS OF EXPANSION

[75] Inventors: Jean G. Bouiller, Brunoy; Gérard E. A. Jourdain, Corbeil Essonnes; Marc G. Loubet, Nandy, all of France

[73] Assignee: Societe Nationale d'Etude et de Construction de Moteurs d'Aviation "S.N.E.C.M.A.", Paris, France

[21] Appl. No.: 269,725

[22] Filed: Nov. 10, 1988

[30] Foreign Application Priority Data

Nov. 12, 1987 [FR] France ............... 87 15615

[51] Int. Cl.⁴ .................................. B05B 15/06
[52] U.S. Cl. ...................... 239/265.11; 60/39.32; 239/397.5; 239/600; 285/187
[58] Field of Search ........... 239/265.11, 397.5, 600; 60/39.32; 285/187, 363, 422

[56] References Cited

U.S. PATENT DOCUMENTS

| 2,839,894 | 6/1958 | Shutts | 60/39.32 |
| 3,188,961 | 6/1965 | Scruggs et al. | 239/265.11 |
| 3,532,274 | 10/1970 | Wilkinson | 239/265.11 |
| 4,016,718 | 4/1977 | Lauck | 60/39.32 |
| 4,238,092 | 12/1980 | Brennan | 244/54 |
| 4,452,038 | 6/1984 | Soligny | 239/397.5 |

FOREIGN PATENT DOCUMENTS

| 555726 | 4/1958 | Canada | 60/39.32 |
| 80404 | 6/1983 | European Pat. Off. . | |

Primary Examiner—Andres Kashnikow
Assistant Examiner—Michael J. Forman
Attorney, Agent, or Firm—Oblon, Spivak, McClelland, Maier & Neustadt

[57] ABSTRACT

Two coaxial bodies of revolution made of materials having distinctly different expansion coefficients are joined together to form an assembly by fixing means comprising at least three resilient brackets of trapezoidal shape, the larger end of each bracket having a flanged edge secured at at least two points by hollow rivets to a metal ring and by bolts extending through the rivets to the body with the higher expansion coefficient, and the smaller end of each bracket being secured by at least one bolt to the body with the lower expansion coefficient in a manner which imposes a cold prestress on the bracket.

4 Claims, 2 Drawing Sheets

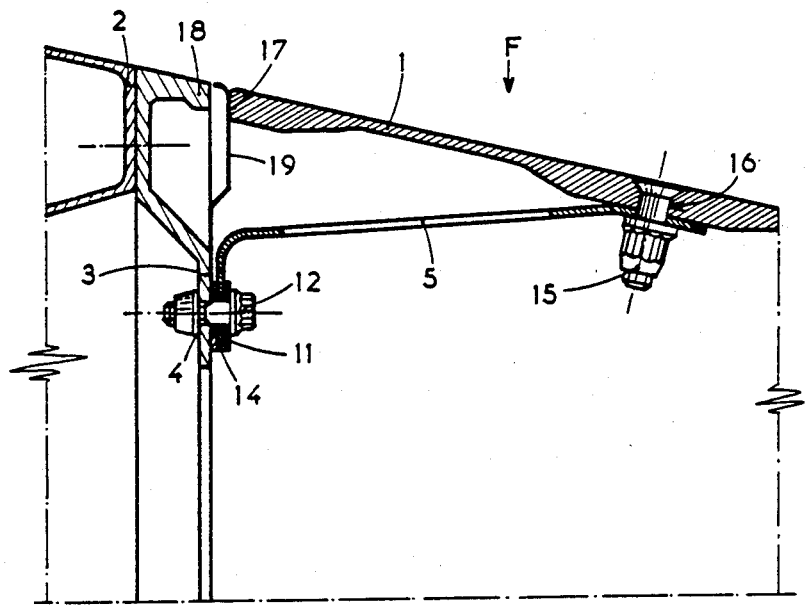
FIG: 1
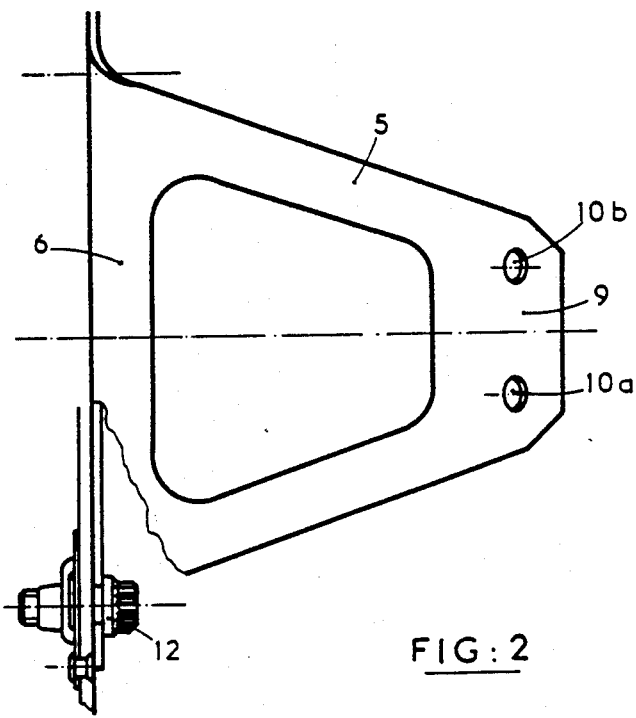
FIG: 2

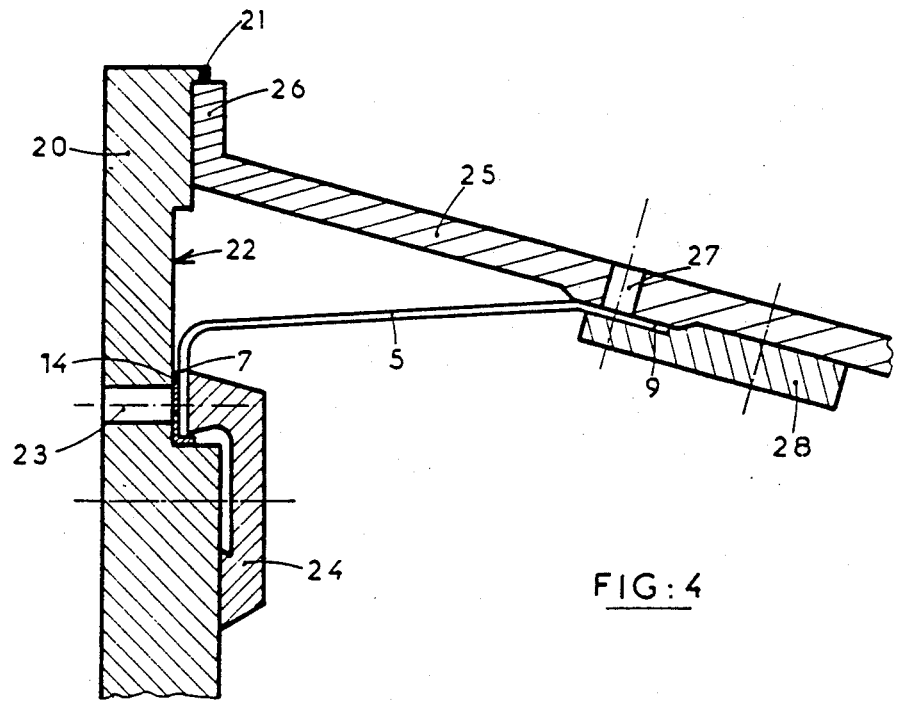
FIG:4
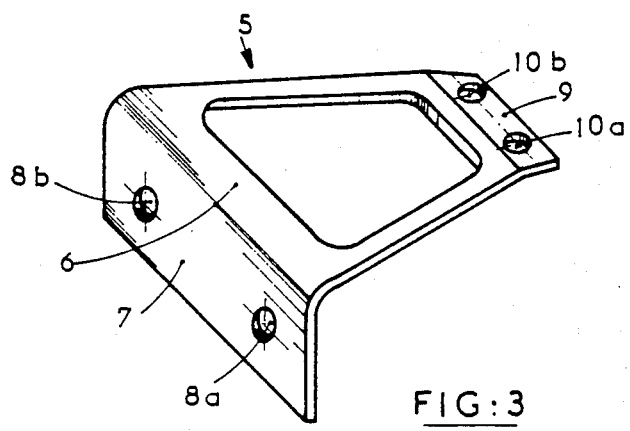
FIG:3
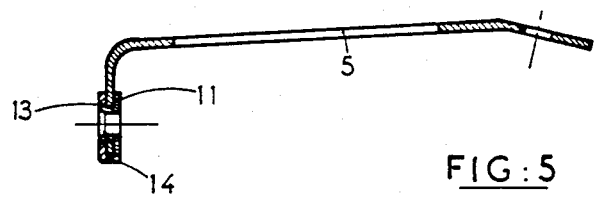
FIG:5

ASSEMBLY OF TWO BODIES HAVING DISTINCTLY DIFFERENT COEFFICIENTS OF EXPANSION

BACKGROUND OF THE INVENTION

1. Field of the invention

The invention relates to an assembly comprising two coaxial bodies of revolution which are made of materials possessing distinctly different thermal coefficients of linear expansion and which are connected together by fixing means, and also relates to a method of assembling these parts. In particular the invention relates to the fixing of the discharge cone of a turbojet engine to the exhaust casing, the discharge cone being made of a composite ceramic material and the exhaust casing being made of metal.

2. Summary of the prior art

The advantages derived from the utilisation of certain so called composite materials, particularly of the ceramic type, and due to their low density and their behaviour at the high temperatures that are sometimes required, are well known in aeronautical engineering, particularly by engine designers. However, the sometimes desirable combination of one part made of a composite material with another part made of metal, and their fixing to each other, such as in the case of the fixing of the discharge cone to the exhaust casing of a turbojet engine, requires connection means suited to the severe operating conditions due, on one hand, to the high temperature environment, and on the other hand, to the alternating stresses induced by differential expansion.

U.S. Pat. No. 4,452,038 proposes a solution to these problems using links and fixing axles. However, its implementation involves assembly difficulties, imposing very close tolerances which make manufacture expensive. Furthermore, in operation, excessive play has also been observed, due to the friction induced by the relative movements.

SUMMARY OF THE INVENTION

It is an object of the invention to solve the problems which result from differential expansion between such parts by eliminating the development of play in the fixing means during operation, while ensuring a reduction of mass, simplicity and ease in the implementation of the assembled unit.

To this end, according to the invention there is provided an assembly consisting of two coaxial bodies of revolution made of materials having distinctly different thermal coefficients of linear expansion, and fixing means securing said two bodies together, wherein said fixing means comprises at least three brackets made of a resilient material, each of said brackets having a generally trapezoidal shape whereby said bracket has a larger end and a smaller end, and a flanged edge at said larger end; a metal ring; hollow rivets fixing said flanged edge of each of said brackets to said metal ring at at least two points of said flanged edge; first bolts rigidly fixing said brackets and said metal ring to said body having the higher thermal coefficient of linear expansion through said hollow rivets., and second bolts fixing said smaller end of each of said brackets to the inner surface of said body having the lower thermal coefficient of linear expansion at at least one point of said smaller end.

Further according to the invention, there is provided a method of assembling two coaxial bodies of revolution made of materials having distinctly different thermal coefficients of linear expansion and fixing means for securing said bodies together to form such an assembly, said fixing means including a metal ring and at least three brackets made of a resilient material, each of said brackets having a generally trapezoidal shape whereby said bracket has a larger end and a smaller end, and a flanged edge at said larger end, said method including the steps of:

providing a support ring having a first annular recess, a second annular recess located radially inwards of said first recess, means defining a plurality of gauged holes arranged in a circle and opening into said second annular recess, said gauged holes corresponding to fixing holes of the one of said bodies having the higher thermal coefficient of linear expansion, and retaining clamps;

locating said metal ring and said flanged edges of said brackets in said second annular recess of said supporting over said gauged holes thereof, and holding said metal ring and said flanged edges in position with said retaining clamps;

drilling fixing holes in said metal ring and said flanged edges of said brackets through said gauged holes whereby each of said flanged edges has fixing holes at at least two points;

providing a pattern of the other of said bodies having means defining a plurality of gauged holes corresponding to fixing holes of said other body, said gauged holes being arranged in a circle having a diameter smaller than that of the circle of fixing holes of said other body, and bracket retaining clamps;

mounting said pattern on said support ring with said pattern centred in said first annular recess, and holding said smaller ends of said brackets against said pattern over said gauged holes thereof by said bracket retaining clamps;

drilling fixing holes in said smaller ends of said brackets through said gauged holes of said pattern;

inserting hollow rivets through said fixing holes drilled in said flanged edges of said brackets and said metal ring to fix said brackets to said ring;

inserting bolts through said fixing holes of said other body and said smaller ends of said brackets to fix said other body to said brackets whereby said brackets undergo deformation in a radially outward direction to introduce a cold prestress; and inserting bolts through said hollow rivets and said fixing holes of said one body to fix said one body to the sub-assembly formed by said ring, said brackets, and said other body.

Other features and advantages of the invention will become apparent from the following description, with reference to the drawings, of embodiments of the invention.

BRIEF DESCRIPTION OF THE DRAWINGS

FIG. 1 shows a partial sectional view of an embodiment of the invention in which the discharge cone of a turbojet engine is connected to the exhaust casing of the engine to form an assembly in accordance with the invention; the section being taken in a plane through the longitudinal axis of the engine;

FIG. 2 shows a partial view of the assembly along arrow F in FIG. 1, with the discharge cone removed;

FIG. 3 shows a perspective view of a metal fixing bracket used in the assembly shown in FIGS. 1 and 2;

FIG. 4 shows a partial sectional view of a drilling jig used in drilling the fixing brackets in a method of forming the assembly in accordance with the invention; the section being taken in a plane through the axis of symmetry of the drilling jig; and, FIG. 5 shows a sectional view of a fixing bracket at another stage in the method of forming the assembly.

DESCRIPTION OF THE PREFERRED EMBODIMENTS

FIG. 1 shows a discharge cone 1 fixed to the exhaust casing 2 of a turbojet engine, the two parts being bodies of revolution about the axis of the engine. The discharge cone 1 is made from a composite material, e.g. of a ceramic type, and the casing 2 is made of metal, particularly a superalloy exhibiting high mechanical stability characteristics at the high temperatures which, in operation, are experienced in the region of the casing and which are generally between 650° C. and 850° C. and may reach 900° C.

The downstream end of the casing 2 has an annular flange 3 extending radially inwards towards the axis of the engine and in which a plurality of evenly spaced holes 4 are drilled in a circle. The discharge cone 1 is fixed on the said flange 3 of the exhaust casing 2 by means of a plurality of metal brackets 5, there being at least three. As may be seen in FIGS. 2 and 3, each bracket 5 has the general shape of an isosceles trapezoid, of which the larger end 6 has a flanged edge 7 in which two holes 8a and 8b are drilled, and the smaller end 9 also has two drilled holes 10a and 10b. The connection between the brackets 5 and the exhaust casing 2 is effected by means of hollow rivets 11 and bolts 12 which pass through the holes 8a, 8b and corresponding holes 4 of the casing flange 3, and also through holes 13 of a metal ring 14 inserted between the flanged edges 7 of the metal brackets 5 and the casing flange 3.

At their other end, the brackets 5 are secured to the discharge cone 1 by means of bolts 15 passing through the holes 10a and 10b and cooperating holes 16 arranged in the discharge cone 1. Between the circular upstream end 17 of the discharge cone 1 and the cooperating downstream end 18 of the exhaust casing 2 a metal joint 19 is placed to ensure continuity and sealing between the edges during operation, while permitting thermal expansion in the longitudinal direction.

The assembly of the elements described is constructed by a particular method in accordance with the invention, which permits cold prestressing of the metal brackets 5, the latter being made of a material allowing adequate elastic deformation. For example, in the described assembly of the discharge cone 1 and the exhaust casing 2 of a turbojet engine, the metal brackets 5 are deformed radially outwards by about 1 mm at the radius. Although the brackets 5 are usually made of metal, they may alternatively be made of composite ceramic material.

The method of assembly comprises a first drilling operation (a) in which the holes 8a and 8b of the flanged edges 7 of the brackets 5 ar drilled at the same time as the holes 13 of the metal ring 14. For this operation (a) a drilling jig as shown in FIG. 4 is used, consisting of a support ring 20 having a first annular recess 21, a second annular recess 22 arranged radially inwards of the first recess 21, and a circle of gauged holes 23 opening out into the second annular recess 22 for guiding the drilling tool (not shown). The metal ring 14 and the flanged edges 7 of the metal brackets 5 are held during the drilling operation (a) between the face of the second annular recess 22 and retaining clamps 24 secured on the support ring 20 by any known means, such as bolts for example.

A second drilling operation (b) is then carried out to drill the holes 10a and 10b in the smaller end 9 of the metal brackets 5, and for this purpose a pattern cone 25 is joined to the drilling jig and is held centered by its base 26 in the first annular recess 21 of the support ring 20. The pattern cone 25 is provided with gauged guide holes 27 which are arranged in a circle having a diameter which is about 2 mm smaller, for example, than that of the circle of the holes 16 which are formed in the discharge cone 1. The brackets 5 are also held relative to the pattern cone 25 by retaining clamps 28 secured on the pattern cone 25 by any known means, such as bolts.

The assembly sequence then continues as follows. In a first securing operation (c), the hollow rivets 11 are inserted into the holes 8a, 8b and the holes 13 to fix the flanged edges 7 of the metal brackets 5 to the metal ring 14. FIG. 5 shows this intermediate stage of the assembly. In a second securing operation (d), the discharge cone 1 is fixed on the metal brackets 5 by means of the bolts 15 which are inserted through the holes 16 of the discharge cone 1 and the holes 10a and 10b at the smaller ends 9 of the brackets 5. To carry out the tightening of the bolts 15 and taking into consideration the 2 mm diameter clearance mentioned above and introduced at the time of the second drilling operation (b), the brackets 5 are resiliently deformed outwards by about 1 mm, thus inducing into the brackets 5 a corresponding cold prestressing during assembly. A third securing operation (e) completes the assembly and consists of fixing the sub-assembly obtained after operations (c) and (d) to the exhaust casing 2 by fitting the bolts 12 through the hollow rivets 11 and the holes 4 of the radial flange 3 of the exhaust casing 2.

For each unit of two coaxial bodies of revolution obtained by the method of assembly which has just been described, the dimensions of the drilling circles and the deformations of the fixing brackets 5 which result therefrom are calculated in such a manner that the cold prestresses of the said brackets tend to cancel out at the high temperatures experienced in operation, as a result of the differences in thermal expansion of the parts of the unit. In this way, a satisfactory mechanical stability is obtained for the assembly in operation, and, in particular, rapid deterioration of the mechanical characteristics and disintegration of the connecting elements is avoided while also avoiding the development of the high stresses normally borne by the fixings. In some applications, and in the absence of the arrangement in accordance with the invention, these stresses may reach values of the order of 700 MPa, which are distinctly greater than those which are permissible for a realistic working life of the superalloy materials usually employed in these applications, particularly aeronautical engineering.

In addition to these advantages it will be further noted that the fixing means between the two coaxial bodies of revolution of an assembly in accordance with the invention are able to absorb tangential stresses and can, in particular, transmit a torque in applications where one of the bodies is a composite shaft and the other a metal body, or vice versa.

The two coaxial bodies of revolution made of materials having distinctly different thermal linear expansion coefficients, which have just been described in an embodiment of the invention as the discharge cone fixed on the exhaust casing of a turbojet engine, may also take the form of a mixer with lobes of a composite material secured on a metal exhaust casing. Alternatively, instead of applying the invention to fixed parts, it may be applied to the connection of rotatable parts, such as a disc of composite material on a metal shaft.

What is claimed is:

1. An assembly consisting of two coaxial bodies of revolution made of materials having distinctly different thermal coefficients of linear expansion, and fixing means securing said two bodies together, wherein said fixing means comprises:
    at least three brackets made of a resilient material, each of said brackets having a generally trapezoidal shape whereby said bracket has a larger end and a smaller end, and a flanged edge at said larger end;
    a metal ring;
    hollow rivets fixing said flanged edge of each of said brackets to said metal ring at at least two points of said flanged edge;
    first bolts rigidly fixing said brackets and said metal ring to said body having the higher thermal coefficient of linear expansion through said hollow rivets; and second bolts fixing said smaller end of each of said brackets to the inner surface of said body having the lower thermal coefficient of linear expansion at at least one point of said smaller end.

2. An assembly according to claim 1, wherein said brackets are made of a metallic material.

3. An assembly according to claim 1, wherein said brackets are made of a composite material.

4. An assembly according to claim 1, wherein said bodies consist of the inner discharge cone and the exhaust casing of a turbojet engine, said discharge cone being made of a composite material and said exhaust casing being made of metal.

* * * * *

UNITED STATES PATENT AND TRADEMARK OFFICE
CERTIFICATE OF CORRECTION

PATENT NO. : 4,907,743

DATED : MARCH 13, 1990

INVENTOR(S) : JEAN G. BOUILLIER ET AL

It is certified that error appears in the above-identified patent and that said Letters Patent is hereby corrected as shown below:

In column 1, line 64, change "rivets.," to --rivets;--.

In column 2, line 19, change "supporting" to --support ring--.

In column 3, line 60, change "ar" to --are--.

Signed and Sealed this

Sixth Day of August, 1991

Attest:

HARRY F. MANBECK, JR.

*Attesting Officer*    *Commissioner of Patents and Trademarks*